United States Patent
Sui et al.

(10) Patent No.: US 11,824,924 B2
(45) Date of Patent: Nov. 21, 2023

(54) SERVICE REQUEST MESSAGE SENDING METHOD, DISTRIBUTED DATABASE ARCHITECTURE AND COMPUTER READABLE STORAGE MEDIUM

(71) Applicant: XI'AN ZHONGXING NEW SOFTWARE CO., LTD., Xi'an (CN)

(72) Inventors: Jian Sui, Shenzhen (CN); Qinyuan Lu, Shenzhen (CN); Lingdong Zhang, Shenzhen (CN); Wenwen Jing, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 17/628,775

(22) PCT Filed: Jun. 8, 2020

(86) PCT No.: PCT/CN2020/094941
§ 371 (c)(1),
(2) Date: Jan. 20, 2022

(87) PCT Pub. No.: WO2021/017646
PCT Pub. Date: Feb. 4, 2021

(65) Prior Publication Data
US 2022/0286498 A1 Sep. 8, 2022

(30) Foreign Application Priority Data

Jul. 29, 2019 (CN) .......................... 201910690727.X

(51) Int. Cl.
*G06F 15/173* (2006.01)
*H04L 67/1008* (2022.01)
(Continued)

(52) U.S. Cl.
CPC ...... *H04L 67/1008* (2013.01); *H04L 67/1012* (2013.01); *H04L 67/1029* (2013.01); *H04L 67/1097* (2013.01)

(58) Field of Classification Search
CPC ............ H04L 67/1008; H04L 67/1012; H04L 67/1029; H04L 67/1097
(Continued)

(56) References Cited

U.S. PATENT DOCUMENTS 10,230,544 B1 * 3/2019 McDowell .......... H04L 12/4645
10,296,258 B1 * 5/2019 Richardson .......... G06F 3/0647
(Continued)

FOREIGN PATENT DOCUMENTS

| CN | 105608144 A | 5/2016 |
| CN | 105975378 A | 9/2016 |
| CN | 110018817 A | 7/2019 |

OTHER PUBLICATIONS

European Patent Office. Extended European Search Report for EP Application No. 20847973.3, dated Aug. 8, 2022, pp. 1-9.
(Continued)

*Primary Examiner* — Alicia Baturay
(74) *Attorney, Agent, or Firm* — Vivacqua Crane, PLLC

(57) ABSTRACT

A service request message sending method, a distributed database architecture and a computer readable storage medium are disclosed. The method includes: receiving (S101) a service request message, and sending (S102) the service request message to a corresponding storage unit through N tiers of computing nodes, where N is an integer greater than or equal to 2, and the closer the tier is to the storage unit, the larger the number of computing nodes in that tier is.

8 Claims, 4 Drawing Sheets

(51) Int. Cl.
*H04L 67/1012* (2022.01)
*H04L 67/1029* (2022.01)
*H04L 67/1097* (2022.01)

(58) Field of Classification Search
USPC .......................................................... 709/226
See application file for complete search history.

(56) References Cited

U.S. PATENT DOCUMENTS

| | | | | |
|---|---|---|---|---|
| 10,303,390 B1 * | 5/2019 | Colgrove | | G06F 11/108 |
| 10,310,760 B1 * | 6/2019 | Dreier | | G06F 13/42 |
| 10,365,982 B1 * | 7/2019 | Brooks | | G06F 11/2082 |
| 10,402,266 B1 * | 9/2019 | Kirkpatrick | | G11C 29/52 |
| 10,425,473 B1 * | 9/2019 | Patel | | H04L 67/1097 |
| 10,452,444 B1 * | 10/2019 | Jibaja | | G06F 3/0665 |
| 10,454,498 B1 * | 10/2019 | Mao | | H03M 7/6023 |
| 10,454,810 B1 * | 10/2019 | Driscoll | | H04L 45/12 |
| 10,459,664 B1 * | 10/2019 | Dreier | | G06F 3/065 |
| 10,467,107 B1 * | 11/2019 | Abrol | | G06F 11/108 |
| 10,484,174 B1 * | 11/2019 | Bernat | | H04L 67/1097 |
| 10,496,330 B1 * | 12/2019 | Bernat | | G06F 3/0688 |
| 10,509,581 B1 * | 12/2019 | Abrol | | G06F 3/0688 |
| 10,514,978 B1 * | 12/2019 | Lee | | G06F 11/008 |
| 10,516,645 B1 * | 12/2019 | Patel | | H04L 67/1095 |
| 10,521,151 B1 * | 12/2019 | Fay | | G06F 3/061 |
| 10,528,488 B1 * | 1/2020 | Lee | | G06F 3/0688 |
| 10,545,687 B1 * | 1/2020 | Bernat | | G06F 12/10 |
| 10,620,830 B2 * | 4/2020 | Donlan | | G06F 3/067 |
| 10,671,302 B1 * | 6/2020 | Aggarwal | | G06F 3/067 |
| 10,671,439 B1 * | 6/2020 | Frandzel | | H04L 43/16 |
| 10,671,494 B1 * | 6/2020 | Abrol | | G06F 11/1469 |
| 10,678,433 B1 * | 6/2020 | Kirkpatrick | | G06F 3/0689 |
| 10,678,436 B1 * | 6/2020 | Jiang | | G06F 3/0661 |
| 10,705,732 B1 * | 7/2020 | Bernat | | G06F 3/067 |
| 10,733,053 B1 * | 8/2020 | Miller | | G06F 11/1088 |
| 10,756,816 B1 * | 8/2020 | Dreier | | H04L 49/357 |
| 10,776,046 B1 * | 9/2020 | Dreier | | G06F 3/0688 |
| 10,776,202 B1 * | 9/2020 | Sanvido | | G06F 11/1096 |
| 10,789,211 B1 * | 9/2020 | Miller | | G06F 3/0608 |
| 10,795,598 B1 * | 10/2020 | Vohra | | G06F 3/0649 |
| 10,817,392 B1 * | 10/2020 | McAuliffe | | G06F 11/0727 |
| 10,838,833 B1 * | 11/2020 | Jibaja | | G06F 11/2094 |
| 10,884,636 B1 * | 1/2021 | Abrol | | G06F 3/0631 |
| 10,908,835 B1 * | 2/2021 | Patel | | G06F 3/065 |
| 10,917,471 B1 * | 2/2021 | Karumbunathan | | G06F 3/064 |
| 10,924,548 B1 * | 2/2021 | Karumbunathan | | G06F 3/064 |
| 10,929,226 B1 * | 2/2021 | Miller | | G06F 11/108 |
| 10,931,450 B1 * | 2/2021 | Chellappa | | H04L 63/068 |
| 10,936,191 B1 * | 3/2021 | Lakshminarayanan | | G06F 3/067 |
| 10,942,650 B1 * | 3/2021 | Fay | | G06F 3/0644 |
| 10,963,189 B1 * | 3/2021 | Neelakantam | | G06F 3/0616 |
| 10,970,395 B1 * | 4/2021 | Bansal | | G06F 21/566 |
| 10,976,948 B1 * | 4/2021 | Lee | | G06F 3/0644 |
| 10,990,282 B1 * | 4/2021 | Lee | | G06F 3/0604 |
| 10,990,480 B1 * | 4/2021 | Bernat | | G06F 3/0689 |
| 10,990,566 B1 * | 4/2021 | Lee | | G06F 16/1774 |
| 11,003,369 B1 * | 5/2021 | Bernat | | G06F 9/4401 |
| 11,010,233 B1 * | 5/2021 | Golden | | G06N 3/047 |
| 11,016,667 B1 * | 5/2021 | Sears | | G06F 3/0607 |
| 11,016,824 B1 * | 5/2021 | Wells | | G06F 11/3075 |
| 11,024,390 B1 * | 6/2021 | Aster | | G06F 3/067 |
| 11,032,259 B1 * | 6/2021 | Bernat | | H04L 63/061 |
| 11,036,596 B1 * | 6/2021 | Coleman | | G06F 11/2094 |
| 11,036,677 B1 * | 6/2021 | Grunwald | | G06F 3/067 |
| 11,042,452 B1 * | 6/2021 | McNutt | | G06F 11/1466 |
| 11,048,590 B1 * | 6/2021 | Sapuntzakis | | G06F 11/1448 |
| 11,068,162 B1 * | 7/2021 | Meister | | G06F 3/0652 |
| 11,086,553 B1 * | 8/2021 | Fisher | | G06F 3/0685 |
| 11,086,713 B1 * | 8/2021 | Sapuntzakis | | G06F 3/0673 |
| 11,089,105 B1 * | 8/2021 | Karumbunathan | | G06F 3/065 |
| 11,093,139 B1 * | 8/2021 | Karr | | G06F 3/0685 |
| 11,095,706 B1 * | 8/2021 | Ankam | | H04L 67/025 |
| 11,112,990 B1 * | 9/2021 | Bernat | | G06F 3/0617 |
| 11,128,448 B1 * | 9/2021 | Bernat | | H04L 9/0894 |
| 11,144,358 B1 * | 10/2021 | Noble | | G06F 11/108 |
| 11,146,564 B1 * | 10/2021 | Ankam | | H04L 63/102 |
| 11,150,834 B1 * | 10/2021 | Fay | | G06F 3/0604 |
| 11,169,727 B1 * | 11/2021 | Doucette | | G06F 3/0604 |
| 11,171,950 B1 * | 11/2021 | Zhuravlev | | H04L 67/141 |
| 11,194,473 B1 * | 12/2021 | Zhao | | G06F 3/0647 |
| 11,210,009 B1 * | 12/2021 | Freilich | | G06F 11/2071 |
| 11,210,133 B1 * | 12/2021 | Barker, Jr. | | G06F 9/4862 |
| 11,221,778 B1 * | 1/2022 | Miller | | H03M 7/3093 |
| 11,275,509 B1 * | 3/2022 | Colgrove | | G06F 11/1076 |
| 11,281,577 B1 * | 3/2022 | Karumbunathan | | G06F 3/0688 |
| 11,288,138 B1 * | 3/2022 | Freilich | | G06F 11/1451 |
| 11,294,588 B1 * | 4/2022 | Miller | | G06F 12/0238 |
| 11,301,152 B1 * | 4/2022 | Sillifant | | G06F 3/067 |
| 11,321,006 B1 * | 5/2022 | Grunwald | | G06F 3/067 |
| 11,327,676 B1 * | 5/2022 | Fernandez | | G06F 12/0862 |
| 11,340,800 B1 * | 5/2022 | Sanvido | | G06F 11/2007 |
| 11,340,837 B1 * | 5/2022 | Vohra | | G06F 3/0605 |
| 11,340,939 B1 * | 5/2022 | Barker, Jr. | | G06F 3/0647 |
| 11,360,689 B1 * | 6/2022 | Grunwald | | G06F 3/067 |
| 11,360,844 B1 * | 6/2022 | Dodsley | | G06F 11/1438 |
| 11,392,553 B1 * | 7/2022 | Power | | G06F 16/2365 |
| 11,397,545 B1 * | 7/2022 | Hamid | | G06F 3/0604 |
| 11,403,000 B1 * | 8/2022 | Barker, Jr. | | G06F 3/0664 |
| 11,416,298 B1 * | 8/2022 | Barker, Jr. | | G06F 3/0605 |
| 11,422,731 B1 * | 8/2022 | Potashnik | | G06F 3/0643 |
| 11,431,488 B1 * | 8/2022 | Sapuntzakis | | H04L 9/085 |
| 11,436,344 B1 * | 9/2022 | Juch | | G06F 21/602 |
| 11,442,652 B1 * | 9/2022 | Dailey | | H04L 41/0894 |
| 11,442,669 B1 * | 9/2022 | Frandzel | | G06F 3/0605 |
| 11,455,168 B1 * | 9/2022 | Potyraj | | G06F 9/3005 |
| 11,461,273 B1 * | 10/2022 | Kleinerman | | G06F 16/1727 |
| 11,467,913 B1 * | 10/2022 | Karr | | G06F 3/065 |
| 11,477,280 B1 * | 10/2022 | Irwin | | H04L 67/51 |
| 11,481,261 B1 * | 10/2022 | Frandzel | | G06F 9/4881 |
| 11,487,715 B1 * | 11/2022 | Karr | | G06F 3/0655 |
| 11,494,109 B1 * | 11/2022 | Sears | | G06F 3/0685 |
| 11,494,692 B1 * | 11/2022 | Watkins | | H04L 67/1089 |
| 11,503,031 B1 * | 11/2022 | Hu | | H04L 9/3242 |
| 11,520,907 B1 * | 12/2022 | Borowiec | | G06F 3/067 |
| 11,526,405 B1 * | 12/2022 | Fisher | | G06F 11/1464 |
| 11,531,577 B1 * | 12/2022 | Bernat | | G06F 11/3452 |
| 11,556,280 B2 * | 1/2023 | Gold | | G06F 3/067 |
| 2007/0203910 A1 | 8/2007 | Ferguson et al. | | |
| 2011/0145286 A1 * | 6/2011 | LaRowe | | G06F 16/951 |
| | | | | 715/705 |
| 2015/0205818 A1 | 7/2015 | Darcy | | |
| 2016/0314409 A1 * | 10/2016 | Bittencourt | | G06N 20/00 |

OTHER PUBLICATIONS

Sheth, et al. "Federated Database Systems for Managing Distributed, Heterogeneous, and Autonomous Databases," ACM Computer Surveys, vol. 22, No. 3, Sep. 1990, pp. 183-236.

International Searching Authority. International Search Report and Written Opinion for PCT Application No. PCT/CN2020/094941 and English translation, dated Sep. 9, 2020, pp. 1-9.

* cited by examiner

SERVICE REQUEST MESSAGE SENDING METHOD, DISTRIBUTED DATABASE ARCHITECTURE AND COMPUTER READABLE STORAGE MEDIUM

CROSS-REFERENCE TO RELATED APPLICATION

The present application is a national stage filing under 35 U.S.C. § 371 of international application number PCT/CN2020/094941, filed Jun. 8, 2020, which claims the priority of Chinese Patent Application No. 201910690727. X filed on Jul. 29, 2019. The content of these application are incorporated herein for reference in their entirety.

TECHNICAL FIELD

Embodiments of the present disclosure relates to the field of distributed databases, in particular to a method for sending a service request message, a distributed database architecture and a computer-readable storage medium.

BACKGROUND

All distributed databases have only one tier of computing nodes, which need to create links with all storage nodes, so obviously, when the computing nodes create links with all storage nodes, the number of back-end links is too large. For example, in case that there are 40 storage nodes in a distributed network, and a computing node receives 1,000 concurrent tasks (service request messages) from a client, the computing nodes may need to create 40*1000 back-end links which will be underutilized (services are generally read and written randomly, and some storage nodes may not be busy at the same moment, so a connection pool may recover links, and the recovered links may need to be re-created at a next moment). In this case, even if there is a connection pool (the recovery and recreating operations of the connection pool also increase the time delay), it is difficult for the computing nodes to maintain these links.

With the expansion of network services, the amount of service data and the number of concurrent tasks from the client will continue to increase, which will probably increase the number of storage nodes to 400. Upon receipt of 10,000 concurrent tasks, one computing node may need to create 4 million (400*10000) back-end links. Therefore, the created back-end links are unthinkable and more difficult to maintain with the continuous increase of the amount of service data and the number of concurrent tasks from the client.

SUMMARY

According to embodiments of the present disclosure, a method for sending a service request message, a distributed database architecture and a computer-readable storage medium are provided to at least solve one of the technical problems in related technologies to a certain extent, e.g., created back-end links are unthinkable and more difficult to maintain with the continuous increase of the amount of service data and the number of concurrent tasks from a client.

In view of this, according to an embodiment of the present disclosure, a method for sending a service request message applied to distributed databases is provided, including: receiving a service request message; and sending the service request message to a corresponding storage unit through N tiers of computing nodes, where N is an integer greater than or equal to 2, and the closer the tier is to the storage unit, the larger the number of computing nodes in that tier is.

According to an embodiment of the present disclosure, a distributed database architecture is further provided, including N tiers of computing nodes, where N is an integer greater than or equal to 2, and the closer the tier is to the storage unit, the larger the number of computing nodes in that tier is; and in response to receiving a service request message, the architecture sends the service request message to a corresponding storage unit through the N tiers of computing nodes.

According to an embodiment of the present disclosure, a computer-readable storage medium storing a computer program for executing the method for sending a service request message is further provided.

Other features and corresponding beneficial effects of the present disclosure are described below in the specification, and it should be understood that at least some of the beneficial effects become apparent from the description of the specification of the present disclosure.

BRIEF DESCRIPTION OF DRAWINGS

The present disclosure will be further described below in conjunction with embodiments and the accompanying drawings, in which.

DETAILED DESCRIPTION

In order to make the objective, technical schemes and advantages of the present disclosure clearer, embodiments of present disclosure will be further described in detail below with reference to the accompanying drawings by embodiments. It should be understood that the embodiments described herein are used merely for explaining the present disclosure, rather than limiting the present disclosure.

Embodiment One

Figure 1:
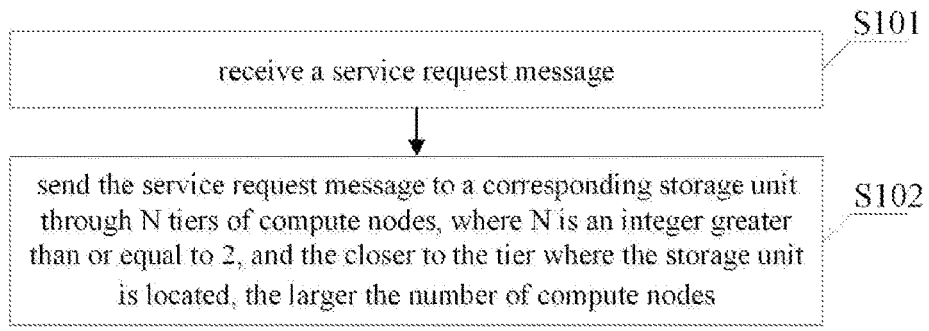
FIG. 1 is a basic flow chart of a method for sending a service request message according to Embodiment One of the present disclosure.

In order to solve at least one of the technical problems in related technologies to a certain extent, (e.g., created back-end links are unthinkable and more difficult to maintain with the continuous increase of the amount of service data and the number of concurrent tasks from a client), according to an embodiment of the present disclosure, a method for a sending service request message is provided, including receiving a service request message and sending the received service request message to a corresponding storage unit through N tiers of computing nodes, where N is an integer greater than or equal to 2, and the closer the tier is to the storage unit, the larger the number of computing nodes in that tier is. FIG. 1 is a basic flow chart of the method for a sending service request message according to this embodiment. As shown in FIG. 1, the method includes following steps.

At step S101, a service request message is received.

At step S102, the service request message is sent to a corresponding storage unit through N tiers of computing nodes, where N is an integer greater than or equal to 2, and the closer the tier is to the storage unit, the larger the number of computing nodes in that tier is.

The terms used in this embodiment will be described first.

Computing node refers to a message broker node responsible for SQL optimizing and routing, load balancing of child nodes, scheduling of distributed transactions, etc.

Storage cluster refers to a collection of storage nodes in a distributed database, where service databases are regularly distributed on the storage nodes in the storage cluster.

Storage unit refers to a subset in the storage cluster, and contains a plurality of storage nodes.

Storage node refers to a DB node in the distributed database which may be relational databases such as Mysql, Oracle and PostgreSQL.

It should be understood that the computing nodes in this embodiment are divided into at least two tiers, i.e., there are at least two tiers of computing nodes, where the closer the tier is to the storage unit, the larger the number of computing nodes in that tier is, i.e., the computing nodes in all tiers are of a pyramidal structure as a whole.

Figure 2:
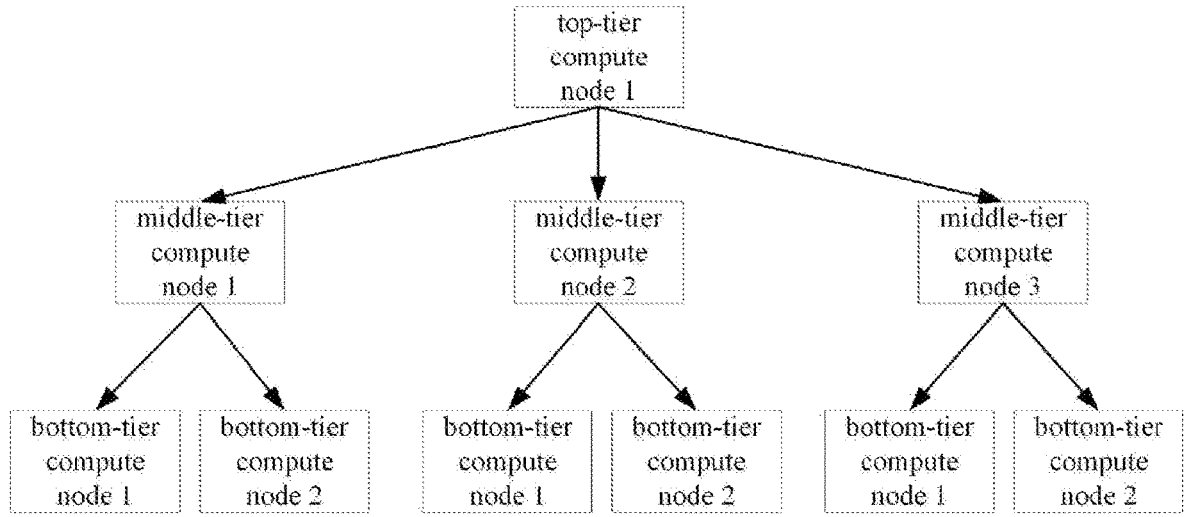
FIG. 2 is a schematic diagram of three tiers of computing nodes according to Embodiment One of the present disclosure.

In some examples, as shown in FIG. 2, there are three tiers of computing nodes, where a first tier of computing nodes may also be called top-tier computing nodes, a second tier of computing nodes may also be called middle-tier computing nodes, and a third tier of computing nodes close to the storage unit may also be called bottom-tier computing nodes. There is one top-tier computing node, three middle-tier computing nodes, and six bottom-tier computing nodes. The top-tier computing node creates links with all middle-tier computing nodes, and the middle-tier computing nodes create links with the bottom-tier computing nodes belonging thereto.

Figure 3:
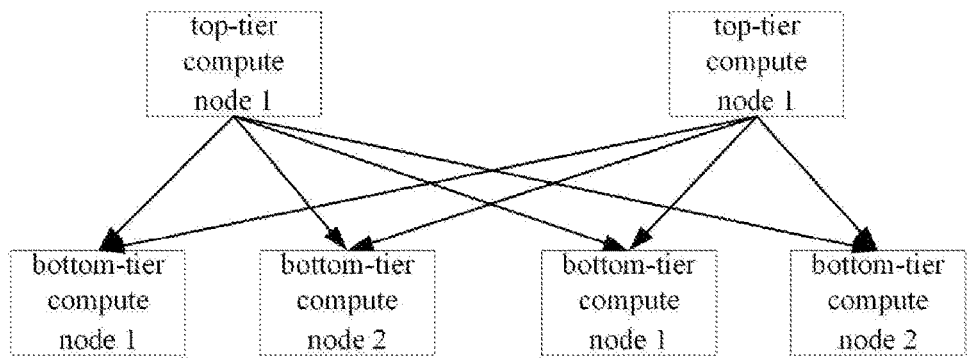
FIG. 3 is a schematic diagram of two tiers of computing nodes according to the Embodiment One of the present disclosure.

In some examples, as shown in FIG. 3, there are two tiers of computing nodes, where a first tier of computing nodes may also be called top-tier computing nodes, and a second tier of computing nodes close to the storage unit may also be called bottom-tier computing nodes. There are two top-tier computing nodes and four bottom-tier computing nodes, and the top-tier computing nodes create links with all bottom-tier computing nodes.

It should be noted that N is not limited to 3 or 2 in the present disclosure. In practical application, the number N of tiers of computing nodes may be determined based on the amount of service data and the number of concurrent tasks from the client.

In some examples of this embodiment, before the service request message is sent to the corresponding storage unit through N tiers of computing nodes, the method further includes the following step.

The storage cluster is divided into at least two storage units each containing at least one storage node.

Figure 4:
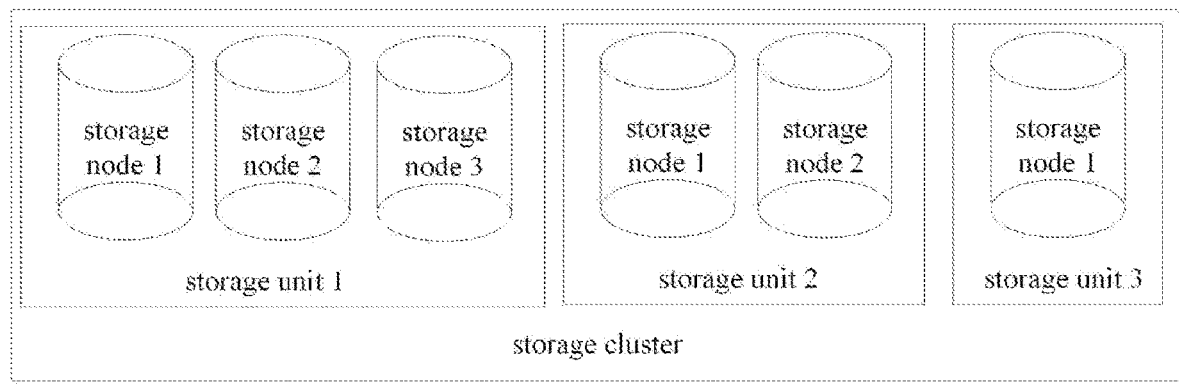
FIG. 4 is a schematic diagram of a storage cluster according to Embodiment One of the present disclosure.

For example, as shown in FIG. 4, the storage cluster is divided into three storage units, namely a storage unit 1, a storage unit 2 and a storage unit 3, where the storage unit 1 contains three storage nodes, the storage unit 2 contains two storage nodes and the storage unit 3 contains one storage node.

It should be noted that, in practical application, the number of storage units into which a storage cluster is divided and the number of storage nodes contained in each storage unit may be flexibly adjusted based on specific service data.

It should be understood that, after the storage cluster is divided into at least two storage units, the addition/deletion (capacity expansion/reduction) of all storage nodes will not affect each other, so that it is easier to implement the addition/deletion (capacity expansion/reduction) of all storage nodes, the capacity change is more flexible and the maintenance cost is reduced to a certain extent.

In some examples of this embodiment, the computing nodes closest to the storage unit are called bottom-tier computing nodes configured to manage and maintain all storage nodes in the storage unit connected thereto, so that there is no need to provide a separate management and maintenance module for managing and maintaining all storage nodes in the storage unit. The bottom-tier computing nodes may manage and maintain all storage nodes in the storage unit connected thereto, thereby saving the cost. Moreover, because there are fewer storage nodes that create links with the computing nodes in the storage unit, it is also easy for management and maintenance.

In some examples of this embodiment, the computing nodes in other tiers other than the bottom-tier computing nodes may enable a function of load balancing.

The top-tier computing nodes may create links with any one of the next-tier computing nodes. In case of busy concurrent services, a plurality of top-tier computing nodes may be enabled. The top-tier computing nodes are independent of each other (independent) and peer-to-peer (sharing metadata information), and have a function of load balancing (or may be integrated with a third-party load balancing module).

The middle-tier computing nodes may be divided by regions. The computing nodes in different regions are independent of each other and not peer-to-peer (with some differences in metadata information). There may be a plurality of computing nodes which are independent of each other and peer-to-peer in each region. The middle-tier computing nodes create links with the computing nodes belonging thereto in the next tier, not with all computing nodes in the next tier. The middle tier may include a plurality of tiers with the same region division rules. The middle-tier computing nodes also have the function of load balancing (or may be integrated with a third-party load balancing module).

It should be understood that the bottom-tier computing nodes only create links with a single storage unit, and the computing nodes in different storage units are independent of each other and not peer-to-peer (with some differences in metadata information). Each storage unit may be provided with a plurality of bottom-tier computing nodes which are independent of each other and peer-to-peer. Because both the top-tier computing nodes and the middle-tier computing nodes have the function of load balancing, and the bottom-tier computing nodes only create links with a single storage unit, the link load on the bottom-tier computing nodes is greatly reduced.

In some examples of this embodiment, the computing nodes in the N tiers may adopt a same distribution policy. For example, the computing nodes in the first, second and third tiers all adopt a distribution policy 1, or a distribution policy 2, or a distribution policy 3.

In some examples of this embodiment, the computing nodes in the N tiers may adopt different distribution policies. For example, the computing nodes in the first tier adopt the distribution policy 1, the computing nodes in the second tier adopt the distribution policy 2 and the computing nodes in the third tier adopt the distribution policy 3.

In some examples of this embodiment, the distribution policy in this embodiment includes at least one of hash distribution policy, range distribution policy, list distribution policy and duplicate distribution policy. It should be noted that the distribution policies listed herein are only a few common ones, which may be flexibly adjusted according to actual needs in practical application.

In the method for sending a service request message according to the embodiment of the present disclosure, upon receipt of a service request message, the service request message is sent to the corresponding storage unit through the N tiers of computing nodes, where N is an integer greater than or equal to 2, and the closer the tier to the storage unit, the larger the number of computing nodes in that tier is, thereby at least solving one of the technical problems in related technologies to a certain extent, e.g., created back-end links are unthinkable and more difficult to maintain with the continuous increase of the amount of service data and the number of concurrent tasks from the client. That is to say, with the method for sending a service request message according to the embodiment of the present disclosure, firstly the computing nodes are divided into tiers (at least two tiers), and the storage cluster is divided into a plurality of (at least two) storage units (each containing at least one storage node), then the number of back-end links of each computing node is greatly reduced by "balancing link load", and finally the service request message is sent to the corresponding storage node through "the computing nodes in each tier using respective distribution policy", thereby avoiding difficulty in maintaining too many back-end links at the same computing node, greatly improving the maintainability of the back-end links at the computing node and greatly reducing the maintenance difficulty.

Embodiment Two

Figure 5:
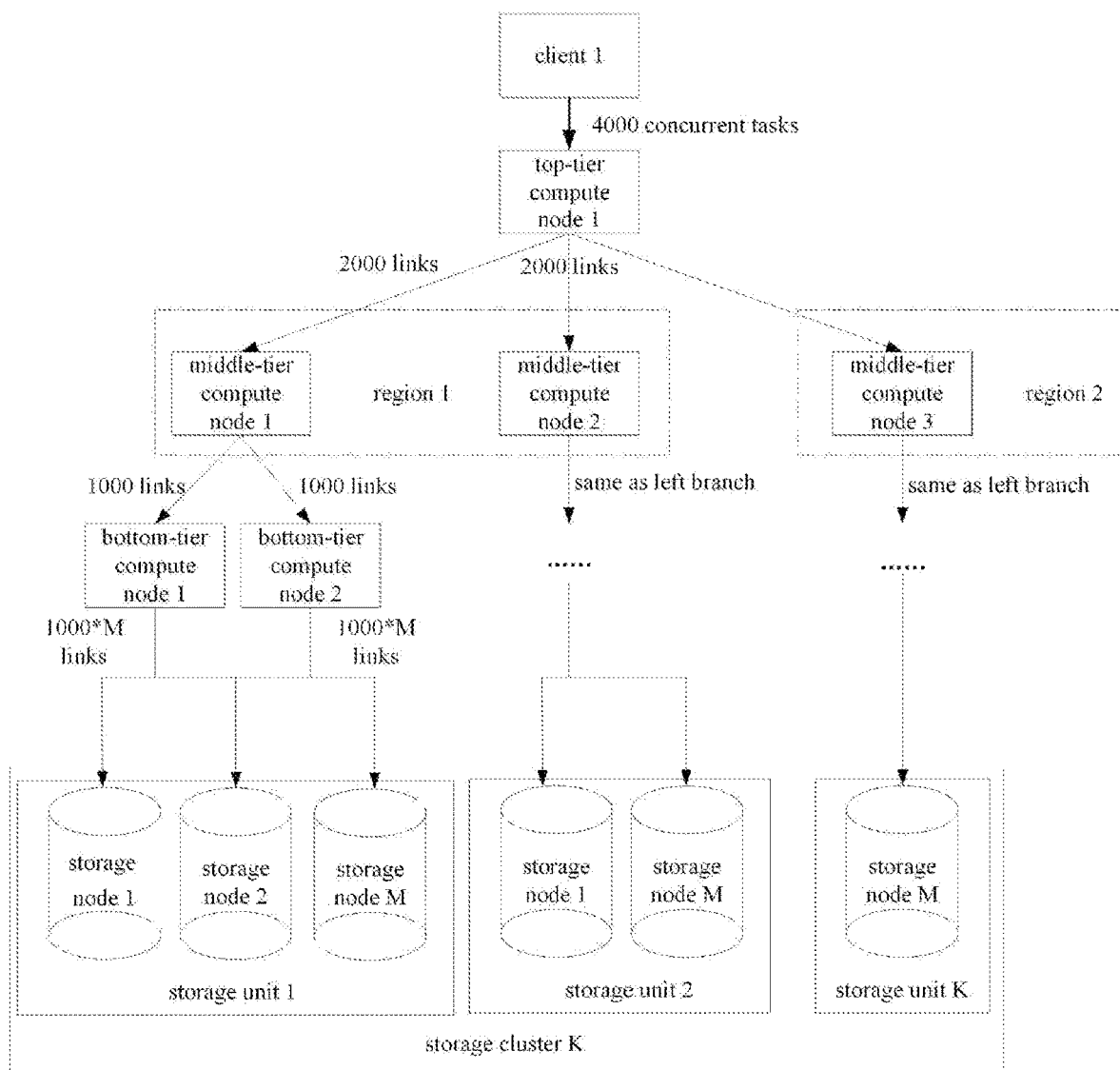
FIG. 5 is a schematic diagram of sending service request messages by three tiers of computing nodes according to Embodiment Two of the present disclosure.

In the embodiment of the present disclosure, a process of sending a service request message in a distributed database architecture having three tiers of computing nodes is described as an example, as shown in FIG. 5.

The computing nodes are divided into three tiers, where top-tier computing nodes may create links with all middle-tier computing nodes, and the middle-tier computing nodes are divided into two regions. It should be understood that the middle-tier computing nodes may be divided into a plurality of regions with computing nodes in the same region being peer-to-peer, and bottom-tier computing nodes may only create links with a single storage unit.

A storage cluster is divided into K storage units each containing M storage nodes, where K is an integer greater than or equal to 2 and M is an integer greater than or equal to 1.

A specific link load division mechanism will be described.

1. A top-tier computing node 1 receives 4,000 concurrent requests from a client 1.

It should be understood that there may be a plurality of clients and a plurality of top-tier computing nodes.

2. The top-tier computing node 1 creates links with two peer-to-peer middle-tier computing nodes in a region 1, with 2,000 links created for each middle-tier computing node by load balancing. At the same time, the top-tier computing node 1 may also create links with the middle-tier computing nodes in other regions, such as middle-tier computing nodes in a region 2, by the same connection mode as in the region 1.

It should be understood that, in some examples of this embodiment, the top-tier computing node 1 creates links with two peer-to-peer middle-tier computing nodes in the region 1, with 1,600 links created for one middle-tier computing node and 2,400 links created for the other one, which may be flexibly adjusted according to actual needs in practical application.

3. The middle-tier computing nodes in the region 1 create links with two peer-to-peer bottom-tier computing nodes, with 1,000 links created for each bottom-tier computing node by load balancing. The bottom-tier computing node may only create links with a single storage unit.

It should be understood that in some examples of this embodiment, a first middle-tier computing node in the region 1 creates links with two peer-to-peer bottom-tier computing nodes, with 600 links created for one bottom-tier computing node and 1,000 links created for the other one, which may be flexibly adjusted according to actual needs in practical application.

4. The bottom-tier computing nodes create links with all the storage nodes in the storage unit. There are 1000*M back-end links (excluding links from other middle-tier computing nodes).

In case that the top-tier computing node directly creates links with all storage nodes in the existing way, there are 4000*M*K back-end links.

From the above, the method for sending a service request message according to the embodiment of the present disclosure has the following beneficial effects.

1. The number of back-end links at multi-tier computing nodes is greatly reduced, thereby reducing the "recovery-recreating operations" of links and solving the bottleneck problem of the number of links loaded at each computing node.

2. The multi-tier computing nodes are more flexible in structure, and the number of tiers of computing nodes, which ranges from 2 to N, may be adjusted according to the number of storage nodes, where N is an integer greater than or equal to 2.

3. After the storage cluster is divided into a plurality of storage units, the maintenance cost of storage units becomes lower and the capacity change is more flexible.

Embodiment Three

Figure 6:
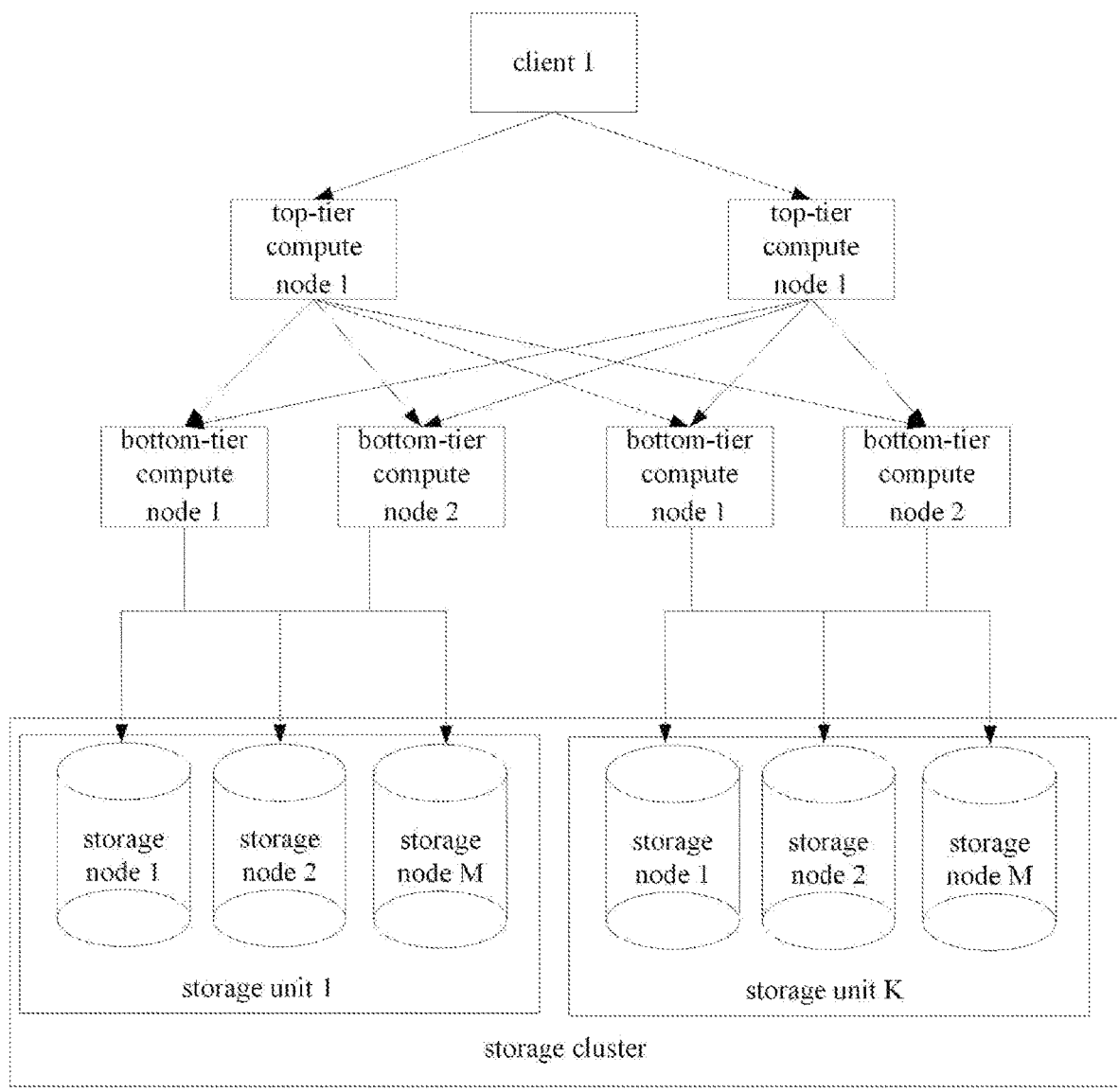
FIG. 6 is a schematic diagram of sending service request messages by two tiers of computing nodes according to Embodiment Three of the present disclosure.

In the embodiment of the present disclosure, a process of sending service request messages in a distributed database architecture having two tire computing nodes is described as an example, as shown in FIG. 6.

The computing nodes are divided into two tiers. The two top-tier computing nodes are relatively independent and peer-to-peer, and may create links with all the bottom-tier computing nodes.

The storage cluster is divided into K storage units each containing M storage nodes, where K is an integer greater than or equal to 2 and M is an integer greater than or equal to 1. The bottom-tier computing nodes on a storage unit 1 and those on a storage unit K are not peer-to-peer, with some differences in metadata (The difference is that the former is bound to the storage unit 1, while the latter is bound to the storage unit 2).

The bottom-tier computing nodes only create links with a single storage unit. According to an example of the number of nodes in FIG. 6, compared with a single computing node directly creating links with all storage nodes, the number of back-end links at a single bottom-tier computing node in the FIG. is reduced to one-Kth of the original value (client links are equally divided at two top-tier computing nodes and converged to each bottom-tier computing node, i.e., the number of front-end links at each bottom-tier computing node is equal to the number of client links, but the storage cluster is divided into K storage units, and the bottom-tier computing node only creates links with a single storage unit, so the back-end links are reduced to one-Kth of the original value).

Embodiment Four

In the embodiment of the present disclosure, a process of adding and deleting storage nodes is described as an example.

Figure 7:
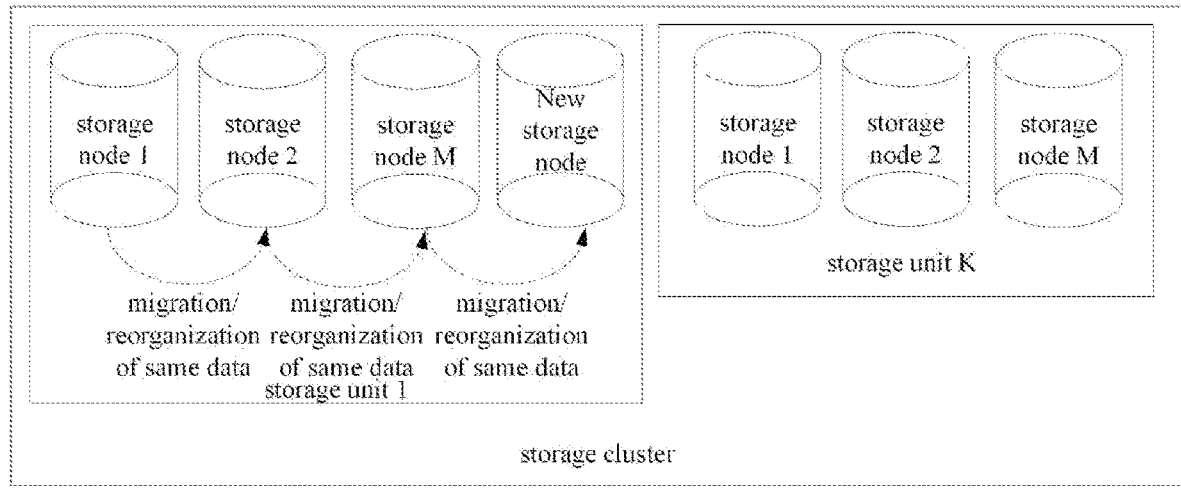
FIG. 7 is a schematic diagram of adding a storage nodes according to Embodiment Four of the present disclosure.

When there is an increase in the amount of service data and the storage nodes may be added, they may be added in appropriate storage units. As shown in FIG. 7, a "new storage node" is added in a storage unit 1. After the "new storage node" is added, the service data is migrated/reorganized only in the storage unit 1 and not in other units, which greatly reduces the cost of adding storage nodes in many scenarios.

Figure 8:
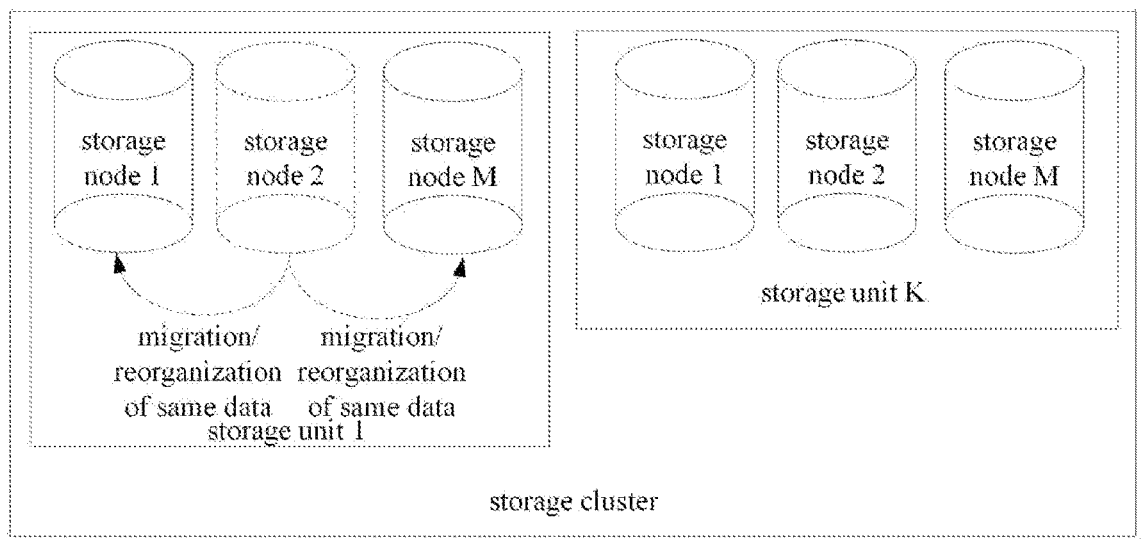
FIG. 8 is a schematic diagram of removing storage nodes according to Embodiment Four of the present disclosure.

When there is a decrease in the amount of service data and the storage nodes may be deleted, they may be deleted from the appropriate storage units. As shown in FIG. 8, a "storage node 2" is deleted from the storage unit 1 (the deleted "storage node 2" is indicated by dashed lines to facilitate observation of service data changes). After the "storage node 2" is deleted, the service data is migrated/reorganized only in the storage unit 1 and not in other units, which greatly reduces the cost of deleting storage nodes in many scenarios.

Embodiment Five

In order to solve at least one of the technical problems in related technologies, (e.g., created back-end links are unthinkable and more difficult to maintain with the continuous increase of the amount of service data and the number of concurrent tasks from a client), according to the embodiment of the present disclosure, a distributed database architecture is provided, including N tiers of computing nodes, where N is an integer greater than or equal to 2, and the closer the tier is to the storage, the larger the number of computing nodes in that tier is. Upon receipt of a service request message, the service request message is sent to a corresponding storage unit through the N tiers of computing nodes.

It should be understood that the computing nodes in this embodiment are divided into at least two tiers, i.e., there are at least two tiers of computing nodes, where the closer the tier is to the storage unit, the larger the number of computing nodes in that tier is, i.e., the number of tiers of computing nodes is of a pyramidal structure.

In some examples, also as shown in FIG. 2, the computing nodes are divided into three tiers, where a first tier of computing nodes may also be called top-tier computing nodes, a second tier of computing nodes may also be called middle-tier computing nodes, and a third tier of computing nodes close to the storage unit may also be called bottom-tier computing nodes. There is one top-tier computing node, three middle-tier computing nodes, and six bottom-tier computing nodes. The top-tier computing node creates links with all middle-tier computing nodes, and the middle-tier computing nodes create links with the bottom-tier computing nodes belonging thereto.

In some examples, also as shown in FIG. 3, the computing nodes are divided into two tiers, where the first tier of computing nodes may also be called top-tier computing nodes, and the second tier of computing nodes close to the storage unit may also be called bottom-tier computing nodes. There are two top-tier computing nodes and four bottom-tier computing nodes, and the top-tier computing nodes create links with all bottom-tier computing nodes.

It should be noted that N is not limited to 3 or 2 in the present disclosure. In practical application, the number N of tiers of computing nodes may be determined based on the amount of service data and the number of concurrent tasks from the client.

In some examples of this embodiment, the storage cluster includes at least two storage units each containing at least one storage node.

For example, also as shown in FIG. 4, the storage cluster include three storage units, namely a storage unit 1, a storage unit 2 and a storage unit 3, where the storage unit 1 contains three storage nodes, the storage unit 2 contains two storage nodes and the storage unit 3 contains one storage node.

It should be noted that, in practical application, the number of storage units into which a storage cluster is divided and the number of storage nodes contained in each storage unit may be flexibly adjusted based on specific service data.

It should be understood that, after the storage cluster is divided into at least two storage units, the addition/deletion (capacity expansion/reduction) of all storage nodes will not affect each other, so that it is easier to implement the addition/deletion (capacity expansion/reduction) of all storage nodes, the capacity change is more flexible and the maintenance cost is reduced to a certain extent.

In some examples of this embodiment, the computing nodes closest to the storage unit are called bottom-tier computing nodes configured to manage and maintain all storage nodes in the storage unit connected thereto, so that there is no need to provide a separate management and maintenance module for managing and maintaining all storage nodes in the storage unit. The bottom-tier computing nodes may manage and maintain all storage nodes in the storage unit connected thereto, thereby saving the cost. Moreover, because there are fewer storage nodes that create links with the computing nodes in the storage unit, it is also easy for management and maintenance.

In some examples of this embodiment, the computing nodes in other tiers other than the bottom-tier computing nodes may enable a function of load balancing.

The top-tier computing nodes may create links with any one of the next-tier computing nodes. In case of busy concurrent services, a plurality of top-tier computing nodes may be enabled. The top-tier computing nodes are independent of each other (independent) and peer-to-peer (sharing metadata information), and have a function of load balancing (or may be integrated with a third-party load balancing module).

The middle-tier computing nodes may be divided by regions. The computing nodes in different regions are independent of each other and not peer-to-peer (with some differences in metadata information). There may be a plurality of computing nodes which are independent of each other and peer-to-peer in each region. The middle-tier computing nodes create links with the computing nodes belonging thereto in the next tier, not with all computing nodes in the next tier. The middle tier may include a plurality of tiers with the same region division rules. The middle-tier computing nodes also have the function of load balancing (or may be integrated with a third-party load balancing module).

It should be understood that the bottom-tier computing nodes only create links with a single storage unit, and the computing nodes in different storage units are independent of each other and not peer-to-peer (with some differences in metadata information). Each storage unit may be provided with a plurality of bottom-tier computing nodes which are independent of each other and peer-to-peer. Because both the top-tier computing nodes and the middle-tier computing nodes have the function of load balancing, and the bottom-tier computing nodes only create links with a single storage unit, the link load on the bottom-tier computing nodes is greatly reduced.

In some examples of this embodiment, the computing nodes in the N tiers may adopt a same distribution policy. For example, the computing nodes in the first, second and third tiers all adopt a distribution policy 1, or a distribution policy 2, or a distribution policy 3.

In some examples of this embodiment, the computing nodes in the N tiers may adopt different distribution policies. For example, the computing nodes in the first tier adopt the distribution policy 1, the computing nodes in the second tier adopt the distribution policy 2 and the computing nodes in the third tier adopt the distribution policy 3.

In some examples of this embodiment, the distribution policy in this embodiment includes at least one of hash distribution policy, range distribution policy, list distribution policy and duplicate distribution policy. It should be noted that the distribution policies listed herein are only a few common ones, which may be flexibly adjusted according to actual needs in practical application.

According to an embodiment of the present disclosure, a computer-readable storage medium storing a computer program for implementing the method for sending a service request message is further provided.

The distributed database architecture according to the embodiment of the present disclosure includes N tiers of computing nodes, where N is an integer greater than or equal to 2, and the closer the tier is to the storage unit, the larger the number of computing nodes in that tier is. Upon receipt of a service request message, the service request message is sent to a corresponding storage unit through the N tiers of computing nodes, thereby at least solving the technical problems in related technologies to a certain extent, e.g., created back-end links are unthinkable and more difficult to maintain with the continuous increase of the amount of service data and the number of concurrent tasks from the client. That is to say, in the distributed database architecture according to the embodiment of the present disclosure, firstly the computing nodes are divided into tiers (at least two tiers), and the storage cluster is divided into a plurality of (at least two) storage units (each containing at least one storage node), then the number of back-end links of each computing node is greatly reduced by "balancing link load", and finally the service request message is sent to the corresponding storage node through "the computing nodes in each tier using respective distribution policy", thereby avoiding difficulty in maintaining too many back-end links at the same computing node, greatly improving the maintainability of the back-end links at the computing node and greatly reducing the maintenance difficulty.

In the method for sending a service request message and the distributed database architecture according to the embodiments of the present disclosure, upon receipt of a service request message, the service request message is sent to the corresponding storage unit through N tiers of computing nodes, where N is an integer greater than or equal to 2, and the closer the tier is to the storage unit, the larger the number of computing nodes in that tier is, thereby solving the problem in related technologies that created back-end links are unthinkable and more difficult to maintain with the continuous increase of the amount of service data and the number of concurrent tasks from the client. That is to say, in the method for sending a service request message and the distributed database architecture according to the embodiments of the present disclosure, the service request messages are sequentially sent to the corresponding storage nodes through N tiers of computing nodes (a pyramidal structure) to reduce the back-end links of the computing nodes tier by tier, thereby avoiding difficulty in maintaining too many back-end links at the same computing node.

Obviously, those having ordinary skill in the art should understand that all or some of the steps in the methods, systems, and functional modules/units in the devices disclosed above may be implemented as software (which may be implemented by computer program codes executable by a computing device), firmware, hardware and appropriate combinations thereof. In the implementations by hardware, the division between functional modules/units mentioned in the above description does not necessarily correspond to the division of physical components. For example, a physical component may have a plurality of functions, or a function or step may be implemented cooperatively by several physical components. Some or all of the physical components may be implemented as software executed by a processor, such as CPU, a digital signal processor or a microprocessor, or as hardware, or as an integrated circuit, such as an application specific integrated circuit. Such software may be distributed on a computer-readable medium, which may include a computer storage medium (or non-transient medium) and a communication medium (or transient medium), executed by a computing device, and in some cases, the steps shown or described may be implemented in a different order than herein. It is well known to those having ordinary skill in the art that the computer storage medium includes volatile and nonvolatile, removable and non-removable media implemented in any method or technology for storing information, such as computer readable instructions, data structures, program modules or other data. Furthermore, it is well known to those having ordinary skill in the art that the communication medium typically contains computer-readable instructions, data structures, program modules, or other data in modulated data signals such as carrier waves or other transmission mechanisms, and may include any information delivery media. Therefore, the present disclosure is not limited to any particular combination of hardware and software.

The above descriptions are further detailed descriptions of the embodiments of the present disclosure with reference to specific implementation ways, and it cannot be assumed that the specific implementation ways of the present disclosure are limited to these descriptions. For those having ordinary skill in the art to which the present disclosure belongs, a number of simple derivations or substitutions may also be made without departing from the concept of the present disclosure, all of which should be regarded as falling into the protection scope of the present disclosure.

What is claimed is:

1. A method for sending a service request message applied to a distributed database, comprising:

dividing a storage cluster into at least two storage units each containing at least one storage node;

receiving a service request message; and sending the service request message to a corresponding storage unit through N tiers of computing nodes, wherein N is an integer greater than 2, and the closer the tier is to the storage unit, the larger the number of computing nodes in that tier is;

wherein the computing nodes closest to the storage unit are bottom-tier computing nodes configured to manage and maintain all storage nodes in the storage unit connected to the bottom-tier computing nodes; and wherein the computing nodes in other tiers other than the bottom-tier computing nodes enable a function of load balancing.

2. The method for sending a service request message of claim 1, wherein the computing nodes in the N tiers adopt a same distribution policy or different distribution policies.

3. The method for sending a service request message of claim 2, wherein the distribution policy includes at least one of hash distribution policy, range distribution policy, list distribution policy and duplicate distribution policy.

4. The method for sending a service request message of claim 1, wherein the computing nodes in the N tiers adopt a same distribution policy or different distribution policies.

5. The method for sending a service request message of claim 4, wherein the distribution policy includes at least one of hash distribution policy, range distribution policy, list distribution policy and duplicate distribution policy.

6. A distributed database architecture, comprising:
a storage cluster divided into at least two storage units each containing at least one storage node; and N tiers of computing nodes, wherein N is an integer greater than 2, and the closer the tier is to the storage unit, the larger the number of computing nodes in that tier is;

wherein a service request message is sent to the corresponding storage unit through the N tiers of compute nodes in response to receipt of the service request message;

wherein the computing nodes closest to the storage unit are bottom-tier computing nodes configured to manage and maintain all storage nodes in the storage unit connected to the bottom-tier computing nodes; and wherein the computing nodes in other tiers other than the bottom-tier computing nodes are configured to enable a function of load balancing which balances the number of back-end links of each of the computing nodes.

7. A non-transitory computer-readable storage medium storing a computer program which, when executed by a processor, causes the processor to perform a method for sending service request message comprising the following steps:

dividing a storage cluster into at least two storage units each containing at least one storage node;

receiving a service request message; and sending the service request message to a corresponding storage unit through N tiers of computing nodes, wherein N is an integer greater than 2, and the closer the tier is to the storage unit, the larger the number of computing nodes in that tier is;

wherein the computing nodes closest to the storage unit are bottom-tier computing nodes configured to manage and maintain all storage nodes in the storage unit connected to the bottom-tier computing nodes; and wherein the computing nodes in other tiers other than the bottom-tier computing nodes enable a function of load balancing.

8. The non-transitory computer-readable storage medium of claim 7, wherein the computing nodes in the N tiers adopt a same distribution policy or different distribution policies.

* * * * *